(12) United States Patent
Mermoud et al.

(10) Patent No.: US 9,285,203 B1
(45) Date of Patent: Mar. 15, 2016

(54) METHODS AND APPARATUS FOR DETERMINING VEHICULAR ASSEMBLY TOLERANCES

(71) Applicant: Honda Motor Co., Ltd., Tokyo (JP)

(72) Inventors: Bryan A. Mermoud, Shelbyville, IN (US); Eric K. Vanderpool, Batesville, IN (US); Joshua K. Gilley, Columbus, IN (US); Phillip Comstock, Shelbyville, IN (US)

(73) Assignee: HONDA MOTOR CO., LTD., Tokyo (JP)

(*) Notice: Subject to any disclaimer, the term of this patent is extended or adjusted under 35 U.S.C. 154(b) by 76 days.

(21) Appl. No.: 14/483,724

(22) Filed: Sep. 11, 2014

(51) Int. Cl.
*G01B 5/25* (2006.01)

(52) U.S. Cl.
CPC .................................. *G01B 5/25* (2013.01)

(58) Field of Classification Search
CPC ........................................................ G01B 5/25
USPC ............................... 33/194, 600, 613, 645
See application file for complete search history.

(56) References Cited

U.S. PATENT DOCUMENTS

| | | | |
|---|---|---|---|
| 2,603,880 A | 7/1952 | Dunn | |
| 5,551,162 A * | 9/1996 | Struble | G01B 5/14 33/544.4 |
| 5,775,036 A * | 7/1998 | Stanley, Sr. | E04F 21/0015 248/354.4 |
| 6,341,427 B1 * | 1/2002 | Tepley | B27F 7/00 33/194 |
| 6,405,446 B1 * | 6/2002 | Monroe | E04F 21/00 33/563 |
| 7,240,436 B1 * | 7/2007 | Miller | E04F 21/0015 33/194 |
| 8,720,073 B1 | 5/2014 | Gordon | |
| 2002/0133957 A1 * | 9/2002 | Farese | E04F 21/003 33/194 |
| 2008/0115379 A1 * | 5/2008 | Park | B60J 10/00 33/613 |
| 2012/0017452 A1 * | 1/2012 | Lam | B23B 47/287 33/194 |
| 2012/0124853 A1 * | 5/2012 | Petersheim | G01B 5/14 33/833 |
| 2015/0168120 A1 * | 6/2015 | Cupertino | G01B 3/30 33/194 |
| 2015/0328692 A1 * | 11/2015 | Beck | B23B 29/20 33/645 |

FOREIGN PATENT DOCUMENTS

| | | |
|---|---|---|
| CN | 201373719 Y | 12/2009 |
| DE | 10 2010 046 206 B3 | 10/2011 |
| JP | 2008-43964 A | 2/2008 |

* cited by examiner

*Primary Examiner* — G. Bradley Bennett
(74) *Attorney, Agent, or Firm* — Kenealy Vaidya LLP (57) ABSTRACT

Some embodiments are directed to a gauge for determining relative positional relationships among assembled vehicular components. The gauge can include a gauge body defining a hook configured to be retained within a ditch joint. The gauge body can also define a curved exterior surface corresponding to a contour of a portion of the exterior surface of a side panel outer that is disposed adjacent a section of the ditch joint in which the hook is retained. The gauge can also include an indicator disposed at a lower portion of the gauge body below the hook. The indicator can determine and indicate a distance separating the lower portion of the gauge body from the door sash in a direction perpendicular to the exterior surface of the door sash, the distance being indicative of an assembly tolerance of relative positions of the side panel outer and the door sash.

20 Claims, 8 Drawing Sheets

METHODS AND APPARATUS FOR DETERMINING VEHICULAR ASSEMBLY TOLERANCES

BACKGROUND

The disclosed subject matter relates to methods and apparatus for determining vehicular assembly tolerances including but not limited to ascertaining relative positional relationships among assembled vehicular components. More particularly, the disclosed subject matter relates to apparatus for determining whether certain vehicular components are placed at acceptable relative positions upon assembly, methods of manufacturing such apparatus, and methods of making this determination.

Vehicle manufacturing can include the assembly of multiple separate and discrete components, and involve many different process steps. For example, a vehicular body can include a side panel outer that is connectable to a door, such as via a hinge. It may be beneficial in some circumstances to initially attach the door in a preassembled or uncompleted state to the side panel outer to perform fitting operations. The door can then be disconnected from the side panel outer to enable the door to be more fully or completely assembled. It may be easier or more efficient to continue or complete assembly of the door while it is detached from the side panel outer. The door can later be re-connected to the side panel outer in its more fully assembled condition.

SUMMARY

The relative placement of various of the assembled vehicular components (including but not limited to properly fitting the door to the side panel outer) can be relevant to certain performance related aspects of the vehicle. For example, the relative placement, orientation, etc., of the side panel outer and certain components of the door assembly, such as an exterior door surface, e.g., an exterior surface of the door sash, can impact various factors including but not limited to wind noise, water leakage, and door closing speed. More specifically, improperly fitting the door to the side panel outer may increase the volume of noise within the passenger compartment while the vehicle is in motion, enable water to leak into the passenger compartment, etc.

It may therefore be beneficial to provide methods and apparatus to determine the proper relative placement or fit between certain vehicular components, such as the side panel outer and the door sash. In some circumstances, the proper fit can be determined based on the relative positions of exterior surfaces of certain areas of the side panel outer and the door sash. For example, comparing vertically aligned exterior surfaces of the side panel outer and door sash can provide an indication as to whether the door is properly fitted to the side panel outer. However, these vertically aligned exterior surfaces are often non-linear and are typically curved, which complicates the comparison.

The relative positions of these curved surfaces can be compared by manually placing an appropriately shaped member, such as a gauge, over both relevant exterior surfaces. More specifically, a surface of the gauge, which is shaped to follow at least the curved exterior surface of the side panel outer, can be placed over these vertically aligned exterior surfaces. For example, a top of the gauge can be placed over a portion of the side panel outer that is immediately above the door, and the bottom can be placed over the portion of the door sash immediately below, while maintaining contact between the gauge's curved surface and at least the exterior surface of the side panel outer. The position of the bottom of the gauge relative to the door sash, such as in a direction perpendicular to the door sash's exterior surface, can indicate proper positioning of these components. For example, a certain distance, such as a distance that exceeds a certain threshold, separating the bottom of the gauge and the door sash's exterior surface can indicate improper relative positioning of these components.

However, some of these surfaces, i.e., exterior surfaces of the side panel outer and door sash, define complex curves, such as curves defining angles that progressively change along their directions of extension. Thus, placing the gauge at different vertical locations along the side panel outer and door sash may yield different results. In other words, the distance between the bottom of the gauge and the door sash may vary based on the location of vertical placement of the gauge. This variation creates inconsistencies in the measurements and thus reduces reliability, accuracy, etc.

It may therefore be beneficial to provide methods and apparatus that enhance the consistency, reliability, accuracy, etc., of these comparisons by enhancing consistent gauge placement. In addition, or as an alternative, it may be beneficial to provide methods and apparatus that enhance the accuracy of these comparisons by providing a range of data indicative of the proper relative positioning of the side panel outer and the door sash, such as data indicating that the vehicular component placement is within an inner range of the specifications, within an outer range of the specifications, or outside of acceptable specifications.

Some embodiments are therefore directed to a gauge for determining relative positional relationships among assembled vehicular components including a side panel outer and a door sash. Each of the side panel outer and the door sash can define an exterior surface, and a ditch joint can be defined between the side panel outer and a vehicular roof panel. The gauge can include a gauge body that defines a hook configured to extend and be retained within the ditch joint. The gauge body can also define a curved exterior surface that corresponds to a contour of a portion of the exterior surface of the side panel outer that is disposed adjacent a section of the ditch joint in which the hook is configured to be retained. The gauge can also include an indicator disposed at a lower portion of the gauge body below the hook. The indicator can be configured to determine and indicate a distance separating the lower portion of the gauge body from the door sash in a direction perpendicular to the exterior surface of the door sash, the distance being indicative of an assembly tolerance of relative positions of the side panel outer and the door sash.

Some other embodiments are directed to a method of determining relative positional relationships among assembled vehicular components including a side panel outer and a door sash. Each of the side panel outer and the door sash can define an exterior surface, and a ditch joint can be defined between the side panel outer and a vehicular roof panel. The method can include retaining a hook of a gauge body within the ditch joint; and contacting a curved exterior surface of the gauge body against a portion of the exterior surface of the side panel outer that is disposed adjacent a section of the ditch joint in which the hook is retained, the curved exterior surface corresponding to a contour of the portion of the exterior surface of the side panel outer. The method can also include indicating, with an indicator that is disposed at a lower portion of the gauge body below the hook, a distance separating the lower portion of the gauge body from the door sash in a direction perpendicular to the exterior surface of the door sash, the distance being indicative of an assembly tolerance of relative positions of the side panel outer and the door sash.

Still other embodiments are directed to a method of manufacturing a gauge for determining relative positional relationships among assembled vehicular components including a side panel outer and a door sash. Each of the side panel outer and the door sash can define an exterior surface, and a ditch joint can be defined between the side panel outer and a vehicular roof panel. The method of manufacturing can include forming a hook in a gauge body that is configured to extend and be retained within the ditch joint; forming a curved exterior surface in the gauge body that corresponds to a contour of a portion of the exterior surface of the side panel outer that is disposed adjacent a section of the ditch joint in which the hook is configured to be retained; and disposing an indicator at a lower portion of the gauge body below the hook. The method of manufacturing can also include configuring the indicator to determine and indicate a distance separating the lower portion of the gauge body from the door sash in a direction perpendicular to the exterior surface of the door sash, the distance being indicative of an assembly tolerance of relative positions of the side panel outer and the door sash.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Overall Vehicle

Figure 1:
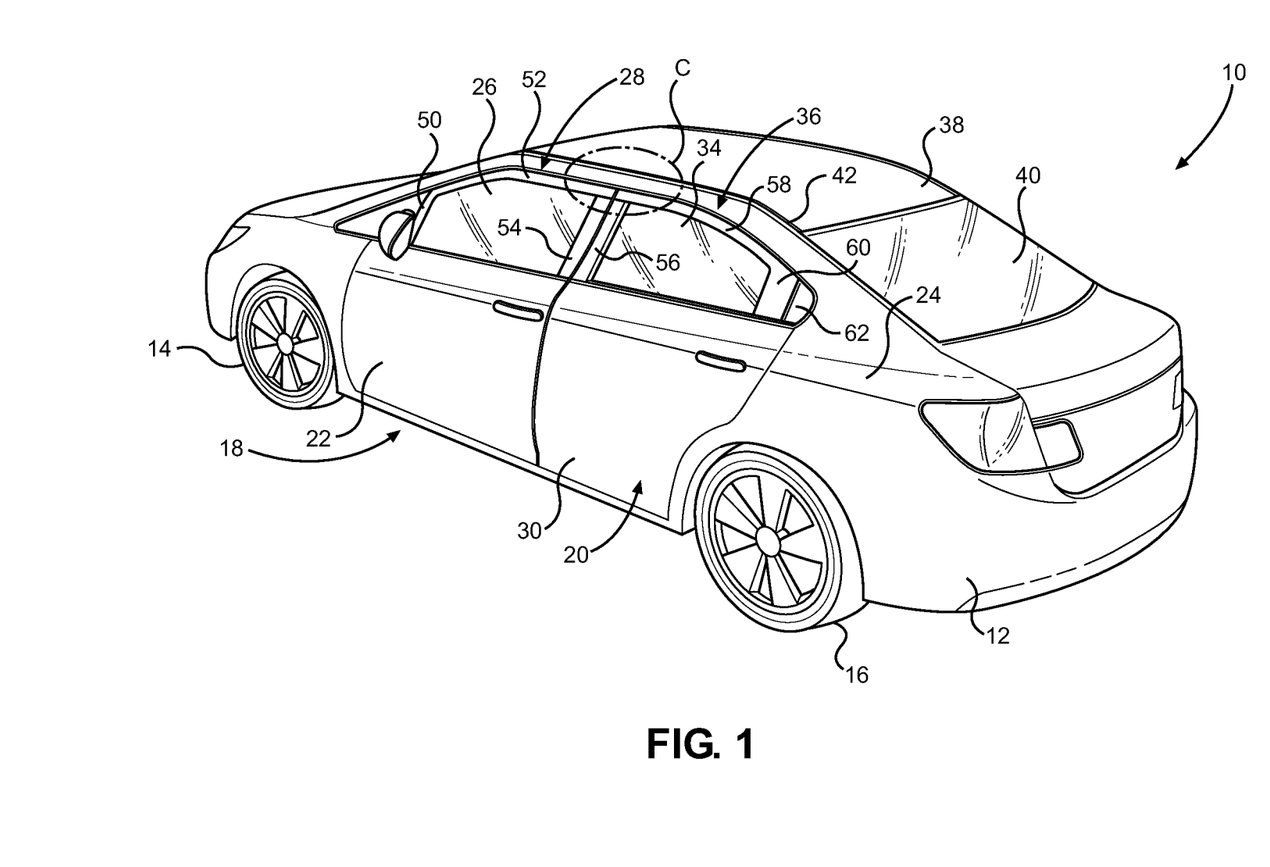
FIG. 1 is a perspective view of an exemplary vehicle for use with a door sash placement gauge in accordance with the disclosed subject matter.

FIG. 1 is a perspective view of an exemplary vehicle for use with a door sash placement gauge in accordance with the disclosed subject matter. The vehicle 10 shown in FIG. 1 is an automobile, and in particular a four door sedan.

However, the disclosed methods and apparatus for determining vehicular assembly tolerances (such as those that ascertain relative positional relationships among assembled vehicular component) can be used with any vehicle that is configured for travel along any one or combination of improved, unimproved, and unmarked paths. For example, embodiments are intended to include or otherwise cover any type of automobile, including a passenger car, minivan, truck, other types of all-terrain vehicle (ATV), semi-tractor, off-highway vehicle, etc. Thus, embodiments are also applicable to vehicles specialized for use on an unimproved path or on an unmarked path, and can be referred to as a multipurpose utility vehicle (MUV) or as a side-by-side all-terrain vehicle (S×S, or S×S ATV).

In fact, embodiments are intended to include or otherwise cover applications with any other type of vehicle, such as an aircraft, boat, ship, train, spacecraft, etc. Some other embodiments can be used in non-vehicular applications, such as for amusement park rides, playground apparatus, or any other situation where it is relevant to ascertain relative positional relationships among assembled components.

The vehicle 10 can include a body 12, a pair of front wheels, 14, a pair of rear wheels 16, a pair of front door assemblies 18, a pair of rear door assemblies 20, a roof panel 38 and a rear window 40. The vehicle 10 may, of course, include any number of other or alternative features.

Each front door assembly 18 can include numerous components, including a front door 22, a front door window 26, and a front door sash 28. The front door window 26 can be disposed to slide into and out of the front door 22, and the front door sash 28 can extend around three sides of the perimeter of the front door window 26 if the front door window 26 extends out of the front door 22 and above the front door 22. In the embodiment of FIG. 1, the front door sash 28 can extend around the upper and side surfaces of the front door window 26, but not the bottom surface. The front door sash 28 can include a first front vertical sash element 50, a first rear vertical sash element 54 (also referred to as a front center sash), and a first horizontal sash element 52 that can extend between and to the upper ends of the vertical sash elements 50, 54.

The structure of each rear door assembly 20 is generally similar to that of each front door assembly 18, except that each rear door assembly 20 can include a rear immobile door window 62. For example, each front door assembly 20 can include a rear door 30, a rear door window 34, and a rear door sash 36. The rear door window 34 can be disposed to slide into and out of the rear door 30, and the rear door sash 36 can extend around three sides of the perimeter of the rear door window 34 if the rear door window 34 extends out of the rear door 30 and above the rear door 30. In the embodiment of FIG. 1, the rear door sash 36 can extend around the upper and side surfaces of the rear door window 34, but not the bottom surface. The rear door sash 36 can include a second front vertical sash element 56 (also referred to as a rear center sash), a second rear vertical sash element 60, and a second horizontal sash element 58 that extends between the upper ends of the vertical sash elements 56, 60.

The front and rear door assemblies 18, 20 each can be configured to selectively open and close access through the door openings by moving between a closed position and a fully opened position, such as via a hinge. In the closed position, the door assemblies 18, 20 can span the respective door openings to obstruct access to a vehicle interior, such as a passenger area, via the door openings. The fully opened position can be any position where the door assemblies 18, 20 are pivoted away from the respective door openings to provide substantially unobstructed access to the passenger area via the door openings. FIG. 1 shows the door assemblies 18, 20 in the closed position.

The vehicle 10 shown in FIG. 1 also can include a side panel outer 24, which extends above and on both sides of the front and rear door assemblies 18, 20. The side panel outer can form a vehicle exterior surface, and may be connected to inner structural members of the vehicle 10. The front and rear door assemblies 18, 20 may each be connected to the side panel outer 24, such as by hinges.

Figure 2:
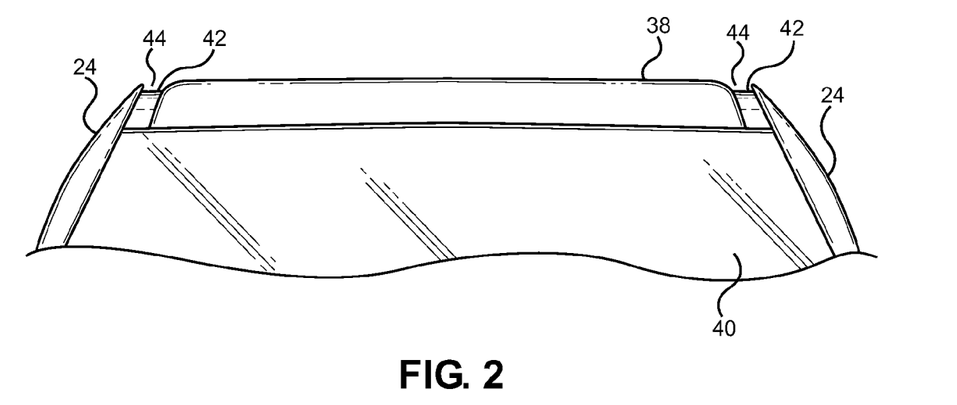
FIG. 2 is a rear view of the vehicle of FIG. 1.

In many of the disclosed embodiments, each side of the vehicle 10 is symmetrical. However, embodiments are also intended to cover vehicles with asymmetrical configurations. FIG. 2 is a rear view of the vehicle of FIG. 1, and illustrates a symmetrical application.

In the embodiment of FIG. 2, separate side panel outers 24 extend on either side of the rear window 40. The roof panel 38 can be disposed between the side panel outers 24, and a ditch joint 42 is defined between each side panel outer 24 and the roof panel 38. An upper surface of each ditch joint 42 can be recessed from the outer surface of the roof 38 and the outer surface of the side panel outer 24 so as to form a gap 44 above the ditch joint 42 between the side panel outer 24 and the roof panel 38.

II. Door Sash Placement Gauge

Certain embodiments of a door sash placement gauge 100 are disclosed below, and FIGS. 3-13 illustrate some of these embodiments. However, embodiments are intended to include or otherwise cover many different embodiments and structures for determining whether certain vehicular components are placed at acceptable relative positions upon assembly.

Embodiments of the door sash placement gauge 100 are disclosed below in the context of determining relative positional relationships between certain sections of the side panel outer and the door sashes, and in some cases the relative flushness of the components. However, embodiments are intended to be used to determine acceptable relative positions of many different vehicular components upon assembly other than or in addition to the disclosed sections of the side panel outer and the door sashes.

Figure 3A:
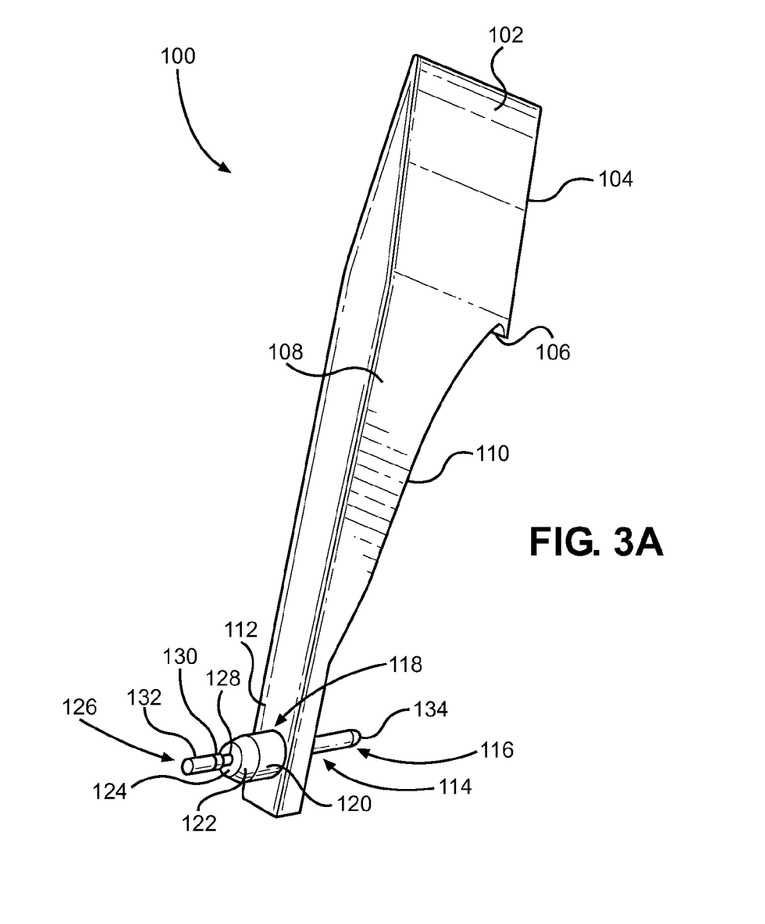
FIG. 3A is a perspective view of an exemplary door sash placement gauge in accordance with the disclosed subject matter.
Figure 4:
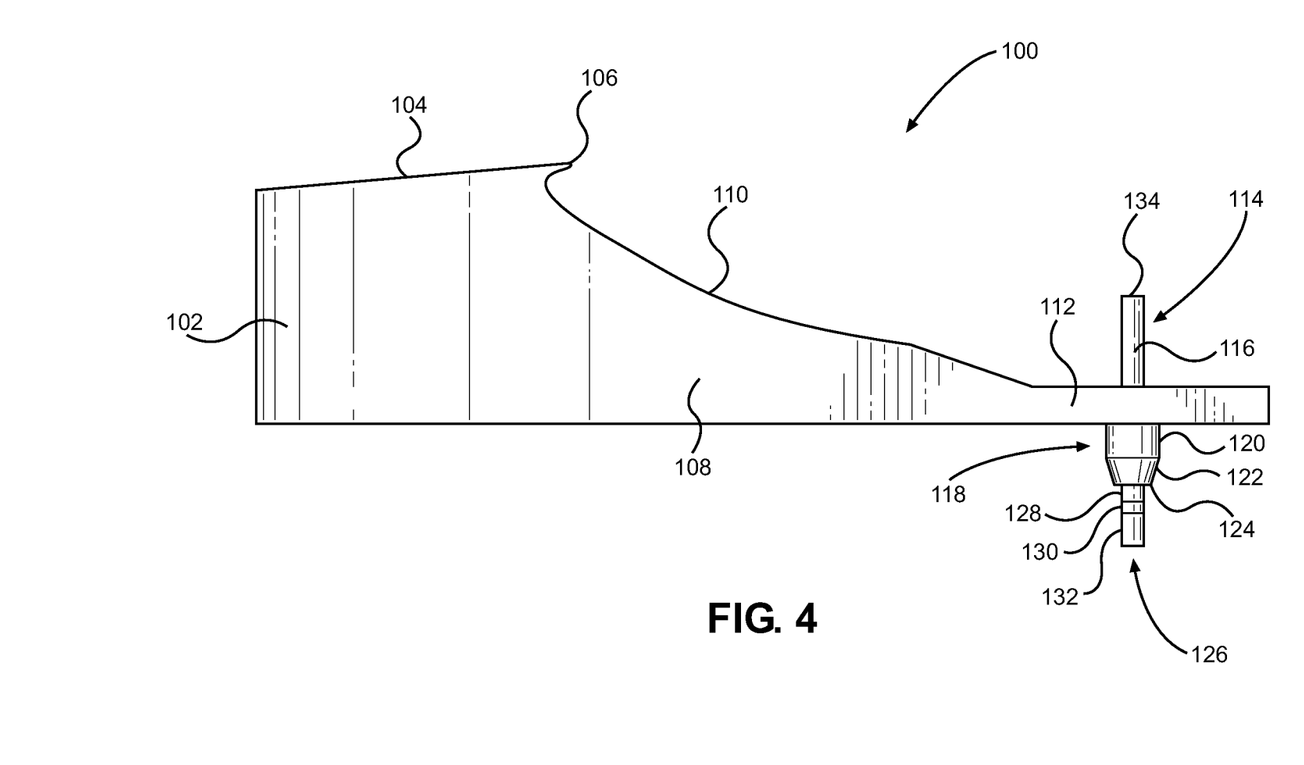
FIG. 4 is a side view of another exemplary door sash placement gauge in accordance with the disclosed subject matter.

FIG. 3A is a perspective view of an exemplary door sash placement gauge 100 in accordance with the disclosed subject matter; and FIG. 4 is a side view of another exemplary door sash placement gauge in accordance with the disclosed subject matter. As illustrated in FIGS. 3A and 4, the door sash placement gauge 100 can include a body and a placement rod assembly 114, which are disclosed below.

A. Body

The body of the door sash placement gauge 100 can include an upper portion 102, an intermediate portion 108, and a lower portion 112. Each of these portions 102, 108 and 112 is discussed in detail below.

The upper portion 102 can define the top end of the door sash placement gauge 100. In the embodiments of FIGS. 3A and 4, a linear surface 104 can define the front end of the upper portion 102. However, the upper portion 102 can have any structure that does not impede the operations disclosed herein, such as determining relative positional relationships between certain sections of the side panel outer and the door sashes. For example, the upper portion 102 can be used for adjusting flushness at gaps between hood to fender, fender to door, etc.

In fact, the upper portion 102 can be configured to perform various other operations. For example, the upper portion 102 can be configured to indicate certain information. In some embodiments, and as disclosed in more detail below, the door sash placement gauge 100 can be tailored to determine relative positional relationships among certain components of a specific type of vehicle, such as a certain make and model of automobile. Thus, door sash placement gauges 100 can be tailored to be used with each make and model of automobile. In this case, the upper portion 102 can be configured to indicate the specific make and model of automobile for which the door sash placement gauge 100 is intended to be used, and/or the position on the vehicle 10 at which the door sash placement gauge 100 is to be used.

The intermediate portion 108 can be disposed adjacent and immediately below the upper portion 102. A support curved surface 110 can define the front edge of the intermediate portion 108. The support curved surface 110 can be tailored to match or otherwise communicate with a surface of a certain vehicular component, and in particular one of the components that is the object of the measurement.

Figure 3B:
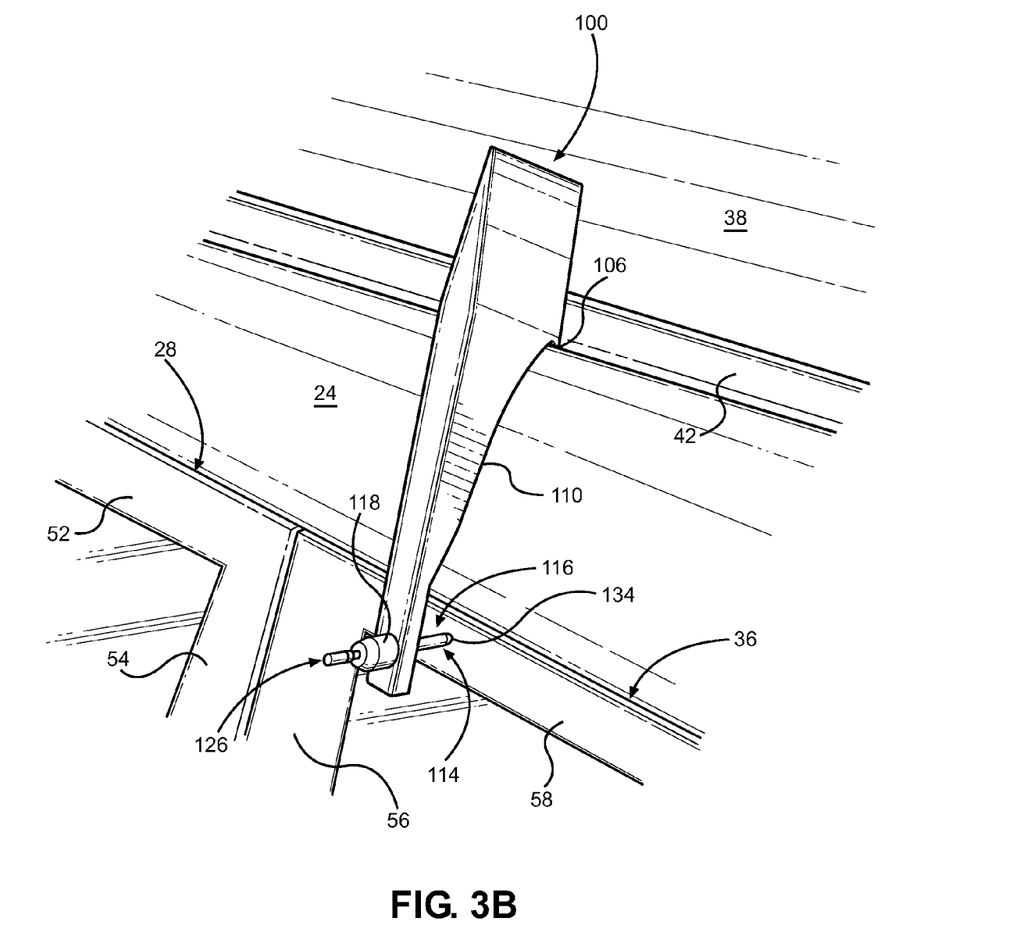
FIG. 3B is an enlarged perspective view of an upper portion C of the vehicle of FIG. 1 and the exemplary door sash placement gauge of FIG. 3A applied to the vehicle.

In the embodiments disclosed below, and as shown in FIG. 3B, the exemplary component at issue is a section of the side panel outer 24 that is disposed directly above the front door sash 28 and/or rear door sash 36. In other words, the curvature or contour of the support curved surface 110 can be configured to match that of the relevant section of the side panel outer 24. However, as disclosed above, embodiments are intended to be configured to determine relative positional relationships among other vehicular or non-vehicular components.

The support curved surface 110 of the intermediate portion 108 and the linear surface 104 of the upper portion 102 meet to form a hook 106. The hook 106 can be configured to be disposed and retained within the ditch joint 42. For example, as shown in FIG. 3B, the hook 106 can be configured to extend within the gap 44 at the ditch joint 42.

This hook 106 configuration may be beneficial for a variety of reasons. For example, retaining the hook 106 at the ditch joint 42 can facilitate predetermined placement of the door sash placement gauge 100, especially with regard to vertical placement. In other words, retaining the hook 106 at the ditch joint 42 can help to ensure that other features and components of the door sash placement gauge 100 are disposed in vertical alignment with certain components of the vehicle 10. For example, this feature can facilitate proper placement of the support curved surface 110 relative to the matching curved exterior surface of the side panel outer 24. The feature also can facilitate proper placement of the lower portion 112 and placement rod assembly 114 (discussed below) relative to the front and rear door sashes 28, 36.

Figure 5:
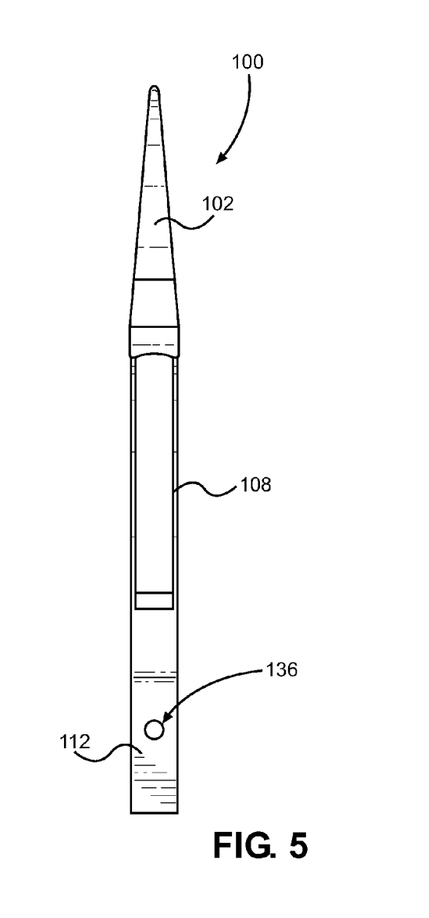
FIG. 5 is a front view of the exemplary door sash placement gauge of FIG. 3A without the placement rod assembly.
Figure 6:
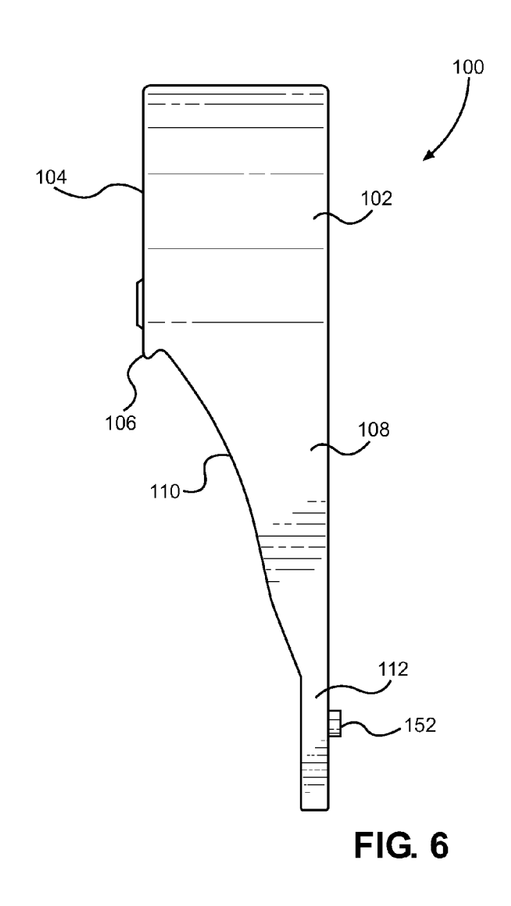
FIG. 6 is a side view of the exemplary door sash placement gauge of FIG. 3A without the placement rod assembly.
Figure 7:
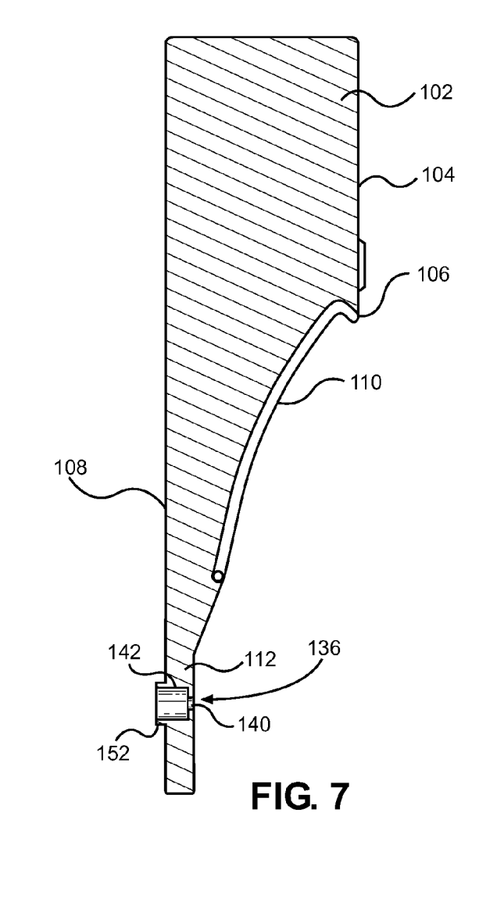
FIG. 7 is a cross-sectional side view of the exemplary door sash placement gauge of FIG. 3A without the placement rod assembly.
Figure 8:
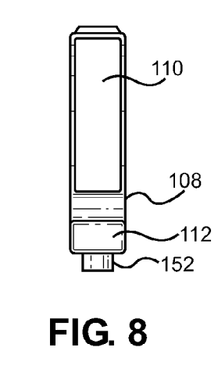
FIG. 8 is a bottom view of the exemplary door sash placement gauge of FIG. 3A without the placement rod assembly.
Figure 9:
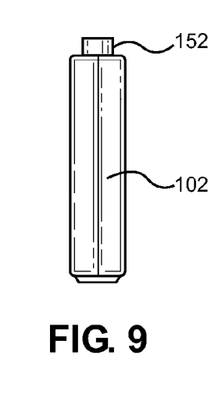
FIG. 9 is a top view of the exemplary door sash placement gauge of FIG. 3A without the placement rod assembly.

FIGS. 5-9 illustrate the body, and in particular the door sash placement gauge 100 without the placement rod assembly 114. For example, FIG. 5 is a front view of the exemplary door sash placement gauge of FIG. 3A without the placement rod assembly, FIG. 6 is a side view, FIG. 7 is a cross-sectional side view, FIG. 8 is a bottom view, and FIG. 9 is a top view.

As shown in FIGS. 5 and 7, an aperture 136 can extend through the entire lower portion 112. The aperture 136 of these embodiments can include two discrete sections, including a narrow portion 140 and a wide portion 142. As shown in FIGS. 3A, 4, 7 and 13, the narrow portion 140 can terminate at the surface of the lower portion 112 proximal the tip end 134 of the placement rod 116. The wide portion 142 can terminate at the surface of the lower portion 112 proximal the cap 118.

As shown in FIGS. 6-9, the lower portion 112 can define a threaded boss 152. The threaded boss 152 can be coaxial with the aperture 136 and can extend from a surface of the lower portion 112 proximal the cap 118. Although not shown in the figures, a circumferentially extending exterior surface of the threaded boss 152 can include threads. As discussed in more detail below, the threads of the threaded boss 152 can communicate with threads of the cap 118 to secure the cap 118 to the threaded boss 152 and thereby the lower portion 112 of the door sash placement gauge 100.

B. Placement Rod Assembly

FIGS. 3A and 4 illustrate the door sash placement gauge 100 with the placement rod assembly 114 disposed at the lower portion 112. The placement rod assembly 114 can include a placement rod 116 defining a tip end 134 and can extend from a surface of the lower portion 112 that is immediately below the support curved surface 110. As shown in FIG. 3B, the placement rod 116 can be configured and disposed such that, when the support curved surface 110 contacts or otherwise communicates with the side panel outer 24, the tip end 134 contacts the front or rear door sash 28, 36.

As shown in FIGS. 3A and 4, the placement rod assembly 114 also can include an indicator rod 126 that can be disposed at an end that is opposite to the tip end 134. Thus, the indicator rod 126 can extend from a surface of the lower portion 112 that is opposite from the surface from which the tip end 134 extends.

Figure 10:
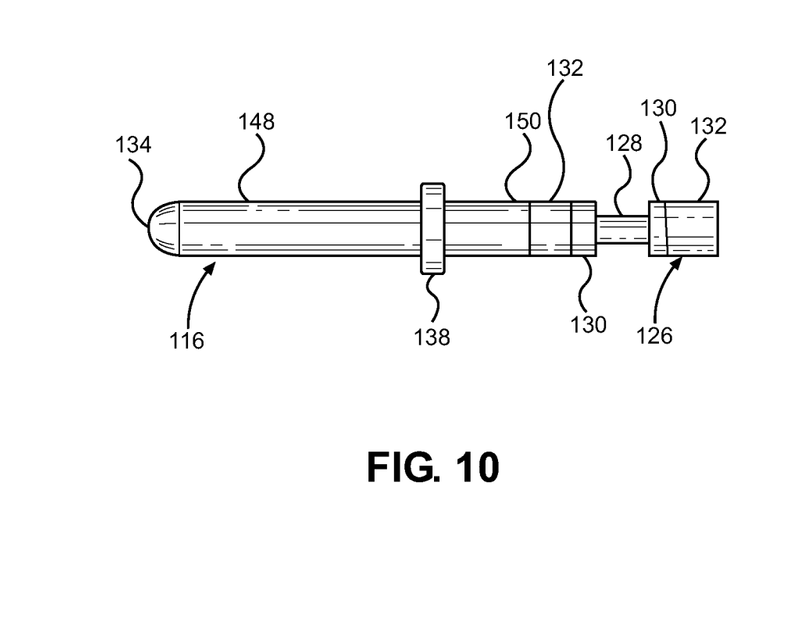
FIG. 10 is a side view of an exemplary placement rod in accordance with the disclosed subject matter.
Figure 13:
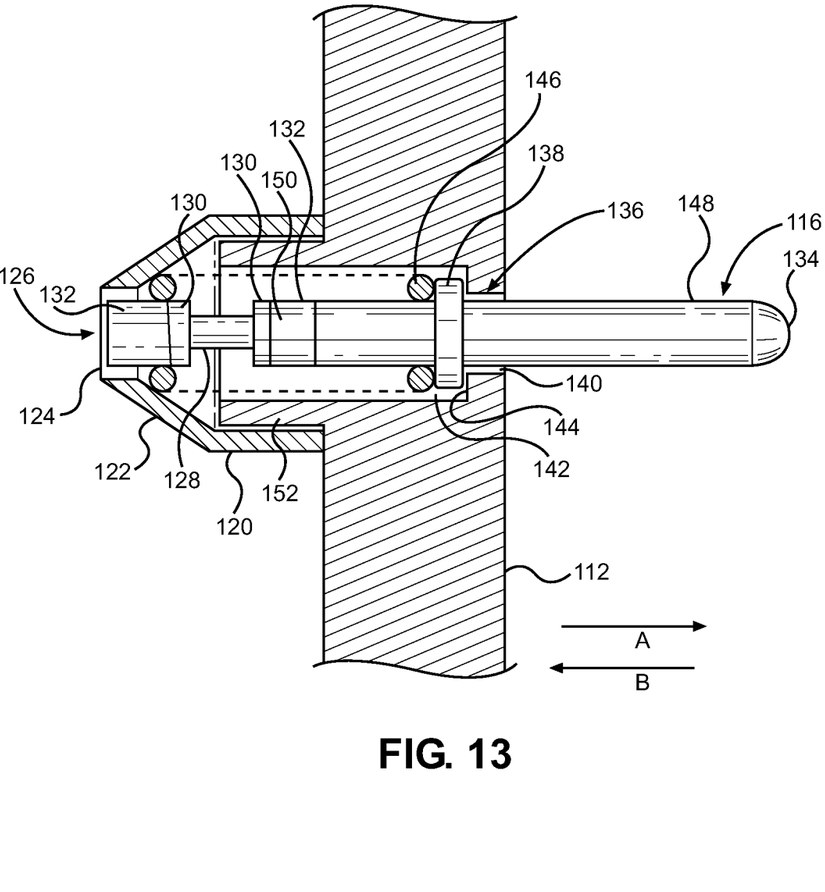
FIG. 13 is a side cross-sectional view of an exemplary placement rod assembly connected to a lower portion of the door sash placement gauge of FIG. 3A.

The indicator rod 126 can include separate first, second, and third regions 128, 130, and 132, respectively. As shown in FIGS. 10 and 13, the first region 128 is disposed at a central location relative to the other regions 130, 132. The second region 130 is disposed at opposite sides of the first region 128, and the third region 132 is disposed at opposite sides of the second region 130. Thus, the second and third regions 130, 132 are symmetrically disposed about the first region 128.

In some embodiments, the first, second and third regions 128, 130, and 132 are visually distinguishable from each other. Embodiments are intended to include or otherwise cover any configuration of these regions 128, 130, and 132 that enables them to be visually distinguishable. For example, the first, second and third regions can each be a color that is different than a color of the other regions. In some of these embodiments, the first region 128 is green, the second region 130 is yellow, and the third region 132 is red.

However, as indicated above, as an alternative or in addition to the above coloring scheme, the regions 128, 130, and 132 can be distinguishable in other ways, such as by having different diameters. In fact, in the embodiment shown in FIG. 3A, the first region 128 can have a smaller diameter than the second and third regions 130, 132. However, in the embodiment of FIG. 4, all of the regions 128, 130 and 132 can have the same diameter. Still further, indicia can be used to label or otherwise identify the different regions, such as by using a lettering or numbering scheme.

Embodiments are intended to include or otherwise cover any beneficial relative lengths or scales of the regions 128, 130, and 132. For example, in some embodiments, the second region 130 can extend +/−0.5 mm from the first region 128 in addition to certain relevant limits.

The placement rod assembly 114 also can include a cap 118 that is coaxial with the placement rod 116. However, embodiments are intended to cover or otherwise include other cap 118 dispositions. The cap 118 can be disposed on the same side of the lower portion 112 as the indicator rod 126.

The cap 118 can include multiple portions. For example, the cap 118 can include a cylindrical base portion 120 disposed adjacent an exterior surface of the lower portion 112. The cap 118 can also include a beveled portion 122 that can be disposed at an end of the cylindrical base portion 120 that is opposite to the lower portion 112. In the embodiments of FIGS. 3A and 4, the beveled portion 122 can define an exterior diameter that decreases as it extends away from the cylindrical base portion 120. In other words, the beveled portion 122 can gradually narrow as it extends away from the cylindrical base portion 120. The beveled portion 122 can define a tip end 124 that is opposite to the lower portion 112.

In the embodiments of FIGS. 3A and 4, the placement rod 116 and the cap 118 are each cylindrical. However, embodiments are intended to include or otherwise cover non-cylindrical configurations.

Figure 11:
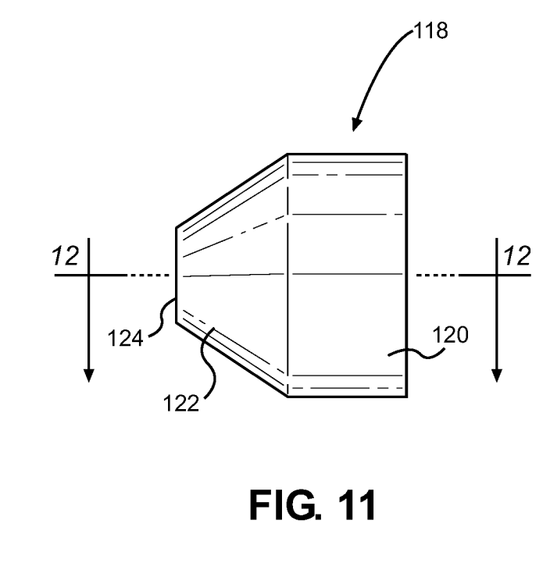
FIG. 11 is a side view of an exemplary cap in accordance with the disclosed subject matter.
Figure 12:
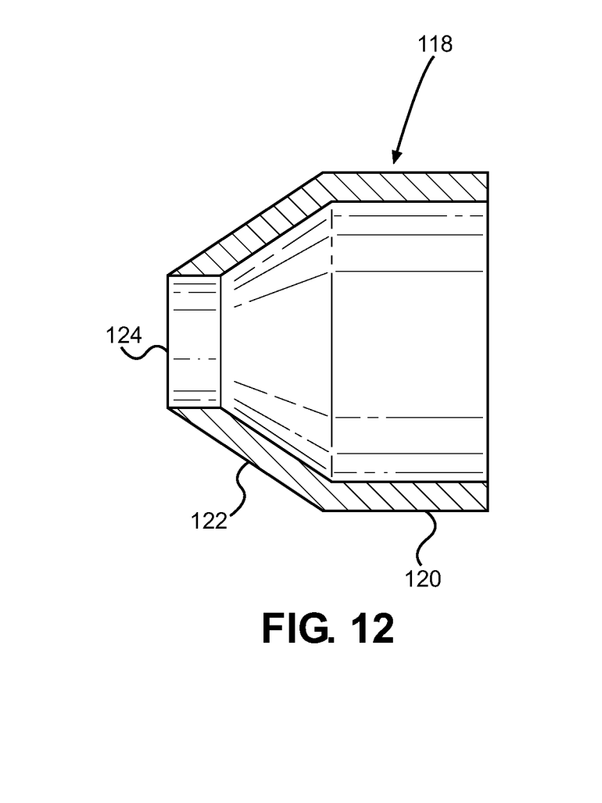
FIG. 12 is a side cross-sectional view of the exemplary cap of FIG. 11.

FIGS. 10-12 illustrate the placement rod assembly 114 in a disassembled condition. Specifically, FIG. 10 is a side view of an exemplary placement rod in accordance with the disclosed subject matter, FIG. 11 is a side view of an exemplary cap in accordance with the disclosed subject matter, and FIG. 12 is a side cross-sectional view of the exemplary cap of FIG. 11.

As shown in FIG. 10, the placement rod 116 can include a cylindrical flange 138 that extends around a circumferential exterior surface thereof. The flange 138 thereby can separate the placement rod 116 into two discrete sections, including a rod outer portion 148 and a rod inner portion 150. The tip end 134 can be defined at the rod outer portion 148.

The indicator rod 126 can be disposed at an end of the rod inner portion 150 opposite the flange 138. In the embodiment of FIG. 10, the first region 128 can have a diameter that is smaller than the diameter of the second and third regions 130, 132, similarly to the embodiment shown in FIG. 3A.

As shown in FIGS. 11 and 12, the cap 118 can be hollow and can include a cylindrical base portion 120 and a beveled portion 122 that defines a tip end 124. The thickness of the walls of the cylindrical base portion 120 and beveled portion 122 are shown as being constant or uniform. Thus, the interior space of the cap 118 can follow the same contour as the exterior surface. In other words, the diameter of the cavity at the cylindrical base portion 120 can be uniform, while the diameter of the cavity at the beveled portion 122 can vary, and in particular can gradually decrease toward the tip end 124.

III. Operation

FIG. 13 is a side cross-sectional view of an exemplary placement rod assembly 114 connected to the lower portion 112 of the door sash placement gauge 100 of FIG. 3A. For simplicity and clarity, only a section of the lower portion 112 adjacent the placement rod assembly 114 is shown.

As shown in FIG. 13, the rod outer portion 148 can extend through the narrow portion 140 of the aperture 136, such that the tip end 134 is spaced from the exterior surface of the lower portion 112. A spring 146 is disposed between and in contact with the flange 138 and an inner surface of the beveled portion 122, and is coaxial with the aperture 136 and placement rod 116. The spring 146 thereby can bias the flange 138 against a retaining wall 144 defined between the aperture narrow portion 140 and the wide portion 142. The placement rod 116 can be thus biased in direction A (shown in FIG. 13), such that the tip end 134 extends away from the exterior surface of the lower portion 112.

The spring 146 can contact an exterior circumferential surface of the indicator rod 126. Because the spring 146 can be coaxial with the placement rod 116, including the indicator rod 126, the spring 146 can operate to maintain the indictor rod 126 in a central location of the aperture of the cap 118. The spring 146 thereby can guide the indicator rod 126 for travel through the opening of the aperture at the tip end 124 of the beveled portion 122.

In operation, if a force is applied to the rod outer portion 148 in a direction perpendicular to the planar outer surface of the lower portion 112 (i.e., a direction parallel to the direction of extension of the placement rod 116), and the force exceeds the force of the biasing force of the spring 146, then the placement rod 116 can move in direction B (shown in FIG. 13). If the placement rod moves a sufficient distance in direction B, then the third region 132 of the indicator rod 126 can extend through the aperture beyond the tip end 124 and can be visible from an exterior of the placement rod assembly 114. If the placement rod moves a sufficient distance further in direction B, then the second and third regions 130, 132 of the indicator rod 126 can extend through the aperture beyond the tip end 124 and can be both thereby visible from an exterior of the placement rod assembly 114. If the placement rod moves a sufficient distance still further in direction B, then the first, second and third regions 128, 130, and 132 of the indicator rod 126 can extend through the aperture beyond the tip end 124 and can be all visible from an exterior of the placement rod assembly 114. Continued movement in Direction B causes the opposed second region 130 to also extend beyond the tip end 124. Still further movement in Direction B causes opposed third region 132 to also extend beyond the tip end 124.

The indicator rod 126 can thereby be used to indicate the length of displacement of the placement rod 116 by viewing which region(s) extend through the aperture beyond the tip end 124 and are thereby visible from an exterior of the placement rod assembly 114. One specific manner of making this determination can be to focus on which region 128, 130, and 132 is disposed at the tip end 124 of the beveled portion 122. Certain predetermined criteria can be assigned to each of the regions 128, 130, and 132, such that the region 128, 130, and 132 disposed at the tip end 124 can be used as an indicator of the corresponding criteria.

The criteria can be assigned to each region 128, 130, and 132 based on application. For example, in some of the disclosed embodiments, the door sash placement gauge 100 is used to determine relative positional relationships between certain sections of the side panel outer and the door sashes, such as flushness. In this application, the first region 128 being disposed at the tip end 124 of the beveled portion 122 can indicate that the positional relationship between these components is within a first range of specifications, and thus acceptable. The second region 130 being disposed at the tip end 124 of the beveled portion 122 can indicate that the positional relationship between these components is within a second range of specifications, i.e., within judgment specifications, and thus judgment needs to be used to determine whether a positional adjustment needs to be made to the components. The third region 132 being disposed at the tip end 124 of the beveled portion 122 can indicate that the positional relationship between these components is outside of specifications, and thus unacceptable. In this case, a determination is made that a positional adjustment needs to be made to the components.

FIG. 3B is a perspective view of the exemplary door sash placement gauge of FIG. 3A as applied to the vehicle of FIG. 1. In operation, the hook 106 can be inserted and retained in the ditch joint 42 proximate the components or portions of components that are to be checked. In the application shown in FIG. 3B, the hook 106 can be inserted and retained in the ditch joint 42 at a location spaced rearwardly from the second front vertical sash element 56 (also referred to as the rear center sash). Embodiments are intended to be used at any location along the ditch joint 42, such as at any location spaced rearwardly from the rear center sash 56. However, in some embodiments, it may be beneficial to space the hook 106 such that the relevant components of the door sash placement gauge 100 are disposed approximately 22 mm rearwardly from the rear center sash 56. For example, this placement may be especially beneficial to determine the relative positional relationship between the side panel outer 24 and the door sashes 28, 36, such as to determine whether the rear door assembly 20 is properly fitted to the side panel outer 24.

Embodiments are intended to include or otherwise cover similar placements forwardly of the first rear vertical sash element 54 (also referred to as the front center sash). For example, embodiments are intended to be used at any location along the ditch joint 42, such as at any location spaced forwardly from the front center sash 54. However, in some embodiments, it may be beneficial to space the hook 106 such that the relevant components of the door sash placement gauge 100 are disposed approximately 22 mm forwardly from the front center sash 54. For example, this placement may be especially beneficial to determine the relative positional relationship between the side panel outer 24 and the door sashes 28, 36, such as to determine whether the front door assembly 18 is properly fitted to the side panel outer 24.

However, embodiments are intended to include or otherwise cover other placements of the door sash placement gauge 100. For example, it may be beneficial to retain the hook 106 within the ditch joint 42 at a location to dispose relevant components of the door sash placement gauge 100 at the rear center sash 56 or front center sash 54.

Once the hook 106 is placed at an appropriate location in the ditch joint 42, the intermediate and lower portions 108, 112 can be moved toward the side panel outer 24 until the support curved surface 110 contacts the corresponding exterior surface of the side panel outer 24. As disclosed above, the contour and curvature of the support curved surface 110 can be configured to match that of the exterior surface of the side panel outer 24. The tip end 134 of the placement rod 116 thereby can contact the exterior surface of the front or rear door sash 28, 36. In the embodiment shown in FIG. 3B, the tip end 134 of the placement rod 116 is in contact with the second horizontal sash element 58.

The contact between the tip end 134 of the placement rod 116 and the exterior surface of the front or rear door sash 28, 36 (in FIG. 3B, the second horizontal sash element 58), can cause the placement rod 116 to move in direction B (see FIG. 13). This movement can cause the indicator rod 126 to move beyond the beveled portion 122 past the tip end 124 to thereby be exposed and viewable from an exterior of the cap 118.

As indicated above, the region 128, 130 and 132 disposed at the tip end 124 can indicate whether the positional relationship between the side panel outer 24 and front and rear door sash 28, 36 is within specifications, within judgment specifications, or outside of specifications. For example, the first region 128 being disposed at the tip end 124 of the beveled portion 122 can indicate that the positional relationship between the side panel outer 24 and front and rear door sash 28, 36 is within specifications and thus acceptable, the second region 130 being disposed at the tip end 124 can indicate that the positional relationship is slightly out of specification, i.e., within judgment specifications and thus judgment needs to be used to determine whether a positional adjustment needs to be made to the components, and the third region 132 being disposed at the tip end 124 can indicate that the positional relationship between these components is outside of specifications and thus unacceptable. The fact that the second and third regions 130, 132 are disposed on either side of the first region 128 enables the indicator rod 126 to determine positional relationships in two dimensions, i.e., the door sash being disposed too far inward or too far outward.

The above configuration thereby provides an accurate and repeatable technique for determining the relative positional relationships among assembled components, and in particular the positional relationship (such as flushness) between the side panel outer 24 and front and rear door sash 28, 36. This configuration also can represent the entire specification range. For example, retaining the hook 106 in the ditch joint 42 ensures that various components of the door sash placement guide 100, such as the intermediate portion 108 and the lower portion 112, are disposed in the proper predetermined vertical positions. Placing these components in the proper vertical positions can enhance accuracy and repeatability of the measurements provided by the indicator rod 126.

In addition to the above, it may be beneficial to tailor data relating to the predetermined contour or curvature of certain components to enhance accuracy. For example, CAD data, which represents the design specification of the contour or curvature of the side panel outer 24, can be used to form the contour or curvature of the support curved surface 110 of the door sash placement guide 100. This data may be beneficial because it represents perfect data or the design goal.

However, utilizing other data may yield even more accurate results. For example, an actual side panel outer 24 can be scanned to obtain a true representation for use as a reference to form the contour or curvature of the support curved surface 110 of the door sash placement guide 100. In other words, measuring an actual side panel outer 24 and configuring the support curved surface 100 from the mathematical model created from the measurement data may enhance accuracy.

IV. Alternative Embodiments

While certain embodiments of the invention are described above, and FIGS. 1-13 disclose the best mode for practicing the various inventive aspects, it should be understood that the invention can be embodied and configured in many different ways without departing from the spirit and scope of the invention.

In the embodiments disclosed above, the region 128, 130 and 132 disposed at the tip end 124 can indicate whether the positional relationship between the side panel outer 24 and front and rear door sash 28, 36 is within specifications, within judgment specifications, or outside of specifications, respectively. The positional relationship is determined based on the region 128, 130 and 132 disposed at the tip end 124 of the beveled portion 122, wherein region 128 (which indicates that the positional relationship is within specifications) is located at the interior end of the indicator rod 126, while region 132 (which indicates that the positional relationship is outside of specifications) is located at the exterior end of the indicator rod 126. The symmetrical disposition of these three regions 128, 130 and 132 thereby determines whether the front and rear door sash 28, 36 (and in effect the door assembly 18, 20) is disposed inwardly too far, i.e., toward the vehicle's interior passenger compartment, or disposed outwardly too far, i.e., away from the vehicle's interior passenger compartment. In other words, region 132, which indicates that the positional relationship is outside of specifications, is disposed at the tip end 124 of the beveled portion 122 if the front and rear door sash 28, 36 (and in effect the door assembly 18, 20) is disposed too far in a direction toward the vehicle's interior passenger compartment or too far in a direction away from the vehicle's interior passenger compartment.

However, embodiments are intended to include or otherwise cover door sash placement gauges that are configured to determine the positional relationships of components where the opposite relationship exists. For example, the regions of the indicator rod can be oppositely disposed for these applications, such that the region that indicates that the positional relationship is beyond specifications is located at the interior end of the indicator rod 126, while the region that indicates that the positional relationship is within specifications is located at the exterior end of the indicator rod 126.

Embodiments are also intended to include or otherwise cover indicator rods that include any number of regions. For example, in some applications, it may be relevant to include only two regions, or four or more regions.

The door sash placement gauge disclosed above includes two separate assemblies, including a body (which includes upper, intermediate, and lower portions 102, 108, and 112) and the placement rod assembly 114. However, these separate assemblies, or parts thereof, can be unitarily formed.

The upper, intermediate, and lower portions 102, 108, and 112 of the body are disclosed above as being unitarily formed. However, some or all of these portions can be separately formed and connected together. In fact, some of these portions 102, 108, and 112 can be removably attached to each other.

In some of these embodiments, the intermediate region 108 is removably attached, which may be beneficial for various reasons. For example, the curvature of the side panel outer may vary from vehicle to vehicle. The support curved surface of the intermediate portion needs to match the contour or curvature of the side panel outer, and thus different door sash placement gauges may need to be used for different vehicles. However, removably attaching the intermediate region would enable intermediate regions with different support curved surfaces to be used. In other words, the intermediate regions could be switched to match the type of vehicle being measured.

As disclosed above, the various inventive concepts can be applied to measuring any components, and thus the embodiments are not limited to measuring the positional relationship between side panel outers and door sashes. Thus, some of these embodiments would not be characterized as door sash placement gauges, and instead may be characterized as alignment gauges or may be referred to using any other relevant terminology.

The placement rod assembly 114 is disclosed above as a spring biased mechanism. However, embodiments are intended to include or otherwise cover any other type or manner of mechanism that provides an indication of the relative positional relationships among components.

Thus, the placement rod assembly of some embodiments may include spring biased mechanisms that are different than the mechanism disclosed above. However, the placement rod assembly of some other embodiments may not include spring biased mechanisms, and instead may include completely different mechanisms for measuring and indicating the positional relationships.

Embodiments are also intended to include or otherwise cover methods of using and methods of manufacturing any or all of the elements disclosed above. The methods of manufacturing include or otherwise cover processors and computer programs implemented by processors used to design various elements of the door sash placement gauge 100 disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A gauge for determining relative positional relationships among assembled vehicular components including a side panel outer and a door sash, each of the side panel outer and the door sash defining an exterior surface, a ditch joint being defined between the side panel outer and a vehicular roof panel, the gauge comprising:
    a gauge body that defines a hook configured to extend and be retained within the ditch joint, the gauge body also defining a curved exterior surface that corresponds to a contour of a portion of the exterior surface of the side panel outer that is disposed adjacent a section of the ditch joint in which the hook is configured to be retained; and
    an indicator disposed at a lower portion of the gauge body below the hook, the indicator being configured to determine and indicate a distance separating the lower portion of the gauge body from the door sash in a direction perpendicular to the exterior surface of the door sash, the distance being indicative of an assembly tolerance of relative positions of the side panel outer and the door sash.

2. The vehicular according to claim 1, wherein the hook is defined adjacent an upper end of the curved exterior surface.

3. The vehicular according to claim 1, wherein the gauge body defines an aperture, and the indicator includes a placement rod assembly that includes a placement rod that extends through the aperture.

4. The vehicular according to claim 3, wherein the body defines a cylindrical threaded boss that is coaxial with the aperture, the placement rod assembly includes a hollow cap having a threaded cylindrical portion that communicates with the threaded boss to retain the cap on the threaded boss such that the cylindrical portion is coaxial with the aperture, and the cap includes a beveled end section that is spaced from the threaded boss.

5. The vehicular according to claim 4, wherein the placement rod includes a flange that is spaced from a tip end that is configured to contact the exterior surface of the door sash, the aperture including a narrow channel and a wide channel that extends through the threaded boss, the wide and narrow channels joining to define a retaining wall, the flange being entirely disposed within the wide channel and having a diameter that is larger than a diameter of the narrow channel.

6. The vehicular according to claim 5, further including a spring that is disposed between the flange and an inner wall of the beveled end section so as to bias the flange against the retaining wall and the tip end of the flange away from the gauge body.

7. The vehicular according to claim 6, wherein the placement rod defines an indicator rod assembly at an opposite end from the tip end, the indicator rod assembly including multiple sections that are visually distinguishable from each other.

8. The vehicular according to claim 7, wherein the multiple sections of the indicator rod assembly include first, second and third regions, the second region being symmetrically disposed on opposite sides of the first region, and the third region being symmetrically disposed on opposite sides of the second region, the first, second and third regions each being a color that is different than a color of the other regions.

9. The vehicular according to claim 8, wherein the placement rod is configured so that the indicator rod assembly is entirely disposed within the cap if the flange is biased against and in contact with the retaining wall.

10. The vehicular according to claim 9, wherein the placement rod is configured so that: only the first region extends beyond an end of the cap if the flange is spaced a first distance from the retaining wall; both the first and second regions extend beyond the end of the cap if the flange is spaced a second distance that is greater than the first distance from the retaining wall; and all of the first, second and third regions extend beyond the end of the cap if the flange is spaced a third distance that is greater than the second distance from the retaining wall.

11. A method of manufacturing a gauge for determining relative positional relationships among assembled vehicular components including a side panel outer and a door sash, each of the side panel outer and the door sash defining an exterior surface, a ditch joint being defined between the side panel outer and a vehicular roof panel, the method of manufacturing comprising:
    forming a hook in a gauge body that is configured to extend and be retained within the ditch joint;
    forming a curved exterior surface in the gauge body that corresponds to a contour of a portion of the exterior surface of the side panel outer that is disposed adjacent a section of the ditch joint in which the hook is configured to be retained;
    disposing an indicator at a lower portion of the gauge body below the hook; and
    configuring the indicator being to determine and indicate a distance separating the lower portion of the gauge body from the door sash in a direction perpendicular to the exterior surface of the door sash, the distance being indicative of an assembly tolerance of relative positions of the side panel outer and the door sash.

12. The method according to claim 11, further including defining the hook so as to be adjacent an upper end of the curved exterior surface.

13. The method according to claim 11, further including defining an aperture in the gauge body, and forming the indicator to include a placement rod assembly that includes a placement rod that extends through the aperture.

14. The method according to claim 13, further including forming a cylindrical threaded boss in the gauge body that is coaxial with the aperture, and forming the placement rod assembly to include a hollow cap having a threaded cylindrical portion that communicates with the threaded boss to retain the cap on the threaded boss, such that the cylindrical portion is coaxial with the aperture, and such that the cap includes a beveled end section that is spaced from the threaded boss.

15. The method according to claim 14, further including forming the placement rod to include a flange that is spaced from a tip end that is configured to contact the exterior surface of the door sash, forming the aperture to include a narrow channel and a wide channel that extends through the threaded boss, the wide and narrow channels joining to define a retaining wall, and configuring the flange to be entirely disposed within the wide channel and to have a diameter that is larger than a diameter of the narrow channel.

16. The method according to claim 15, further including disposing a spring between the flange and an inner wall of the beveled end section so as to bias the flange against the retaining wall and the tip end of the flange away from the gauge body.

17. The method according to claim 16, further including forming the placement rod to include an indicator rod assembly at an opposite end from the tip end, the indicator rod assembly including multiple sections that are visually distinguishable from each other.

18. The method according to claim 17, further including forming the multiple sections of the indicator rod assembly to include first, second and third regions, the second region being symmetrically disposed on opposite sides of the first region, and the third region being symmetrically disposed on opposite sides of the second region, the first, second and third regions each being a color that is different than a color of the other regions.

19. The method according to claim 18, further including configuring the placement rod such that: the indicator rod assembly is entirely disposed within the cap if the flange is biased against and in contact with the retaining wall; only the first region extends beyond an end of the cap if the flange is spaced a first distance from the retaining wall; both the first and second regions extend beyond the end of the cap if the flange is spaced a second distance that is greater than the first distance from the retaining wall; and all of the first, second and third regions extend beyond the end of the cap if the flange is spaced a third distance that is greater than the second distance from the retaining wall.

20. A method of determining relative positional relationships among assembled vehicular components including a side panel outer and a door sash, each of the side panel outer and the door sash defining an exterior surface, a ditch joint being defined between the side panel outer and a vehicular roof panel, the method comprising:

retaining a hook of a gauge body within the ditch joint;

contacting a curved exterior surface of the gauge body against a portion of the exterior surface of the side panel outer that is disposed adjacent a section of the ditch joint in which the hook is retained, the curved exterior surface corresponding to a contour of the portion of the exterior surface of the side panel outer; and indicating, with an indicator that is disposed at a lower portion of the gauge body below the hook, a distance separating the lower portion of the gauge body from the door sash in a direction perpendicular to the exterior surface of the door sash, the distance being indicative of an assembly tolerance of relative positions of the side panel outer and the door sash.

* * * * *